(12) United States Patent
Bryant et al.

(10) Patent No.: US 8,069,907 B2
(45) Date of Patent: Dec. 6, 2011

(54) FLEXIBLE HEAT PIPE

(75) Inventors: Johnny P. Bryant, Austin, TX (US);
James R. Bylander, Austin, TX (US);
Vern E. Radewald, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 1118 days.

(21) Appl. No.: 11/854,956

(22) Filed: Sep. 13, 2007

(65) Prior Publication Data

US 2009/0071632 A1 Mar. 19, 2009

(51) Int. Cl.
*F28D 15/04* (2006.01)
*H05K 7/20* (2006.01)

(52) U.S. Cl. ............ 165/46; 165/104.33; 361/679.52; 361/700

(58) Field of Classification Search ............ 165/104.26, 165/104.33, 46; 361/700, 679.52
See application file for complete search history.

(56) References Cited

U.S. PATENT DOCUMENTS

| | | | | |
|---|---|---|---|---|
| 3,604,503 | A | * | 9/1971 | Feldman et al. ......... 165/104.26 |
| 3,604,504 | A | | 9/1971 | Kessler et al. |
| 3,834,457 | A | | 9/1974 | Madsen |
| 3,913,665 | A | * | 10/1975 | Franklin et al. ......... 165/104.26 |
| 4,138,692 | A | | 2/1979 | Meeker et al. |
| 4,212,347 | A | * | 7/1980 | Eastman .................. 165/46 |
| 4,402,358 | A | | 9/1983 | Wolf |
| 4,489,777 | A | | 12/1984 | Del Bagno et al. |
| 4,561,040 | A | | 12/1985 | Eastman et al. |
| 4,727,932 | A | * | 3/1988 | Mahefkey ................ 165/104.26 |
| 4,813,476 | A | * | 3/1989 | Mahefkey ................ 165/104.26 |
| 4,951,740 | A | | 8/1990 | Peterson et al. |
| 4,953,632 | A | * | 9/1990 | Sakaya et al. ............ 165/104.26 |
| 5,206,791 | A | | 4/1993 | Novotny |
| 5,261,319 | A | | 11/1993 | Laville et al. |
| 5,320,331 | A | | 6/1994 | Hellman, Sr. |
| 5,560,423 | A | | 10/1996 | Larson et al. |
| 5,769,154 | A | | 6/1998 | Adkins et al. |
| 5,781,409 | A | | 7/1998 | Mecredy, III |
| 5,910,883 | A | * | 6/1999 | Cipolla et al. ........... 361/679.27 |
| 5,944,093 | A | | 8/1999 | Viswanath |
| 6,446,706 | B1 | | 9/2002 | Rosenfeld et al. |
| 6,508,302 | B2 | * | 1/2003 | Ishida et al. ............. 165/104.26 |
| 6,510,052 | B2 | * | 1/2003 | Ishikawa et al. ......... 165/104.33 |
| 7,019,973 | B2 | * | 3/2006 | Rivera ..................... 361/700 |

(Continued)

FOREIGN PATENT DOCUMENTS

JP 2000-055576 2/2000

OTHER PUBLICATIONS

Oomi, Masaru, et al.; "State-of-the-art Technologies of Micro Heat-Pipe Heat-Sinks for Notebook PCs", *Furukawa Review*; No. 21 (Apr. 2002); pp. 69-74.

(Continued)

*Primary Examiner* — Leonard R Leo
(74) *Attorney, Agent, or Firm* — Janet A. Kling

(57) ABSTRACT

A heat pipe for cooling a heat-generating component has a generally planar, sealed flexible body having an evaporator section, a condenser section, and a flexible bellows section. The bellows section is located between the evaporator section and the condenser section along a longitudinal length of the body. A chamber extends from the evaporator section to the condenser section inside the body and contains a working fluid. The bellows section includes internal supports to keep the chamber open during repeated bending of the heat pipe at the bellows section.

19 Claims, 8 Drawing Sheets

U.S. PATENT DOCUMENTS

| | | |
|---|---|---|
| 2002/0183815 A1 | 12/2002 | Nest et al. |
| 2005/0081552 A1 | 4/2005 | Nilson et al. |
| 2005/0180109 A1* | 8/2005 | Miyazaki et al. ............. 361/700 |
| 2006/0012958 A1 | 1/2006 | Tomioka et al. |
| 2006/0086482 A1 | 4/2006 | Thayer et al. |
| 2007/0151709 A1* | 7/2007 | Touzov ................... 165/104.26 |

OTHER PUBLICATIONS

"Micro Heat-pipe with 1-mm Thickness", *Furukawa Review*, No. 22 (Sep. 2002); New Products.

"Ultra-thin Sheet-shaped Heatpipe "pera-flex®"", *Furukawa Review*, No. 25 (Mar. 2004); New Products.

"An Innovative Sheet-type Heat Sink Has Been Developed for Heat Dissipation of Mobile Equipment—The Thinnest Heat Conductor in the World—", Furukawa Electric Co., Ltd. [on line]; Apr. 11, 2003 [retrieved from the Internet on Mar. 15, 2006]; URL <www.furukawa.co.jp/english/what/peraflex030411_e.htm>.

* cited by examiner

FLEXIBLE HEAT PIPE

FIELD OF THE INVENTION

This invention relates generally to an apparatus for cooling electronic components included on an integrated circuit and, in particular, to the construction of a heat pipe and more particularly to a flexible heat pipe.

BACKGROUND OF THE INVENTION

Modern day electronic systems are compact and often include one or more high-power, high-density devices, such as microprocessors or other chip sets or chip packages. As the functionality of these microprocessors increases, the circuitry in the processor is becoming denser and operating at higher speeds which results in more heat being produced. The high-power, high-density chips frequently cannot be adequately cooled by the conventional forced air cooling system used to cool the overall electronic system. Instead, these chips require their own, i.e., dedicated, cooling systems. These dedicated cooling systems may include a heat sink, a fan, a heat spreader, or a heat pipe.

The purpose of a heat pipe is to move the heat from the point of generation to a remote location for dissipation. A heat pipe is a sealed, usually evacuated chamber which contains a liquid coolant. The liquid coolant or working fluid changes phase as it absorbs and dissipates heat. The coolant changes from liquid to vapor as heat is transferred to it from the chip, and changes from vapor back to liquid as it dissipates the heat to the surrounding environment.

The end of the pipe which acts as the evaporator is placed in thermal contact with the chip or other heat source. The heat conducts through the walls of the heat pipe to the working fluid. This causes the working fluid to vaporize. The vapor travels to the condenser end of the heat pipe where the vapor is cooled by the surrounding environment causing it to condense back into its liquid phase, thus liberating the heat. A wicking structure or other capillary device draws the condensed working fluid back through the pipe to the evaporator, where heat is again transferred to it from the chip.

Conventional heat pipes are relatively rigid and may include tubular expandable bellows to permit bending of the heat pipe when it is installed in an electronic device. Because these heat pipes are made out of rigid materials such as copper tubes or pieces of sheet metal, they can have relatively thick effective cross-sections. These heat pipes can be bent into their final fixed shape. Generally, large bending radii are required to enable the heat pipe to function properly. These conventional heat pipes thus can not be readily and repeatably deformed, either elastically or plastically, to match the space constraints of the electronic system. In addition, repeated plastic deformation could lead to embrittlement or fatigue of the heat pipe which would result in reliability failures that would shorten the useful lifetime of the heat pipe.

In laptop computers, the central processing unit (CPU), memory chips or other computer chips are typically attached to a printed circuit board located in the base portion of a laptop computer. The heat generated by the chips is either dissipated through the base portion of the laptop computer which can get uncomfortably warm if it is sitting on the user's lap or a fan may be used to move the heat away from the heat generating chips.

Rather than dissipating the heat through the base portion of the laptop computer, it would be advantageous to dissipate the heat to the backside of the screen in the cover of the laptop computer. This requires the heat pipe to pass through the hinge that joins the cover portion to the base portion. In this application, the heat pipe must be flexible to allow for repeated opening and closing of the cover. A current method of addressing this application is to utilize two separate rigid heat pipes connected to a flexible heat sink, typically two hinged blocks of aluminum. The first heat pipe moves the heat from the chip or CPU to the flexible heat sink which transfers the heat through the hinge to a second heat pipe or a heat spreader. The weight of this heat sink assembly, as well as having at least three heat transfer interfaces, makes this approach less desirable for most portable or hand held devices.

Additionally, as consumers demand smaller, more powerful systems, providing space for these rigid heat pipes becomes more of a problem. A need exists for a heat pipe that can fit into relatively narrow spaces and can be flexed repeatably.

SUMMARY OF THE INVENTION

An exemplary embodiment of a heat pipe for cooling a heat-generating component includes a generally planar, sealed flexible body having an evaporator section, a condenser section, and a flexible bellows section. The bellows section is disposed between the evaporator section and the condenser section along a longitudinal length of the body. A chamber extends from the evaporator section to the condenser section inside the body and contains a working fluid. The bellows section includes internal supports to keep the chamber open during bending of the heat pipe at the bellows section. Additionally, the heat pipe includes a wicking structure disposed in at least the condenser section and the bellows section. The wicking structure may be a series of parallel grooves integrally formed on an inside surface of the body. In another exemplary embodiment, the wicking structure may have a plurality of zones comprising different relief features where the relief features include at least one of integrally formed channels, grooves, posts, staggered walls, three dimensional interlace chevrons, three-dimensional interlace crosses, and angled walls.

In another embodiment of the current invention, an electronic device includes a base, a cover, a hinge to pivotably attach the base to the cover, a heat generating component, a heat sink, and heat pipe. The heat pipe comprises a substantially flat, sealed flexible body having an evaporator section, a condenser section and a bellows section. The heat generating component is located in one of the base or the cover and a heat sink is located in the other of the cover or the base. The evaporator section thermally contacts the heat generating device, and the condenser section thermally contacts the heat sink. The flexible bellows section is disposed between the evaporator section and the condenser and may be disposed in the hinge of the electronic device to facilitate repeated bending of the heat pipe without exceeding its elastic limit when the electronic device is opened and closed.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
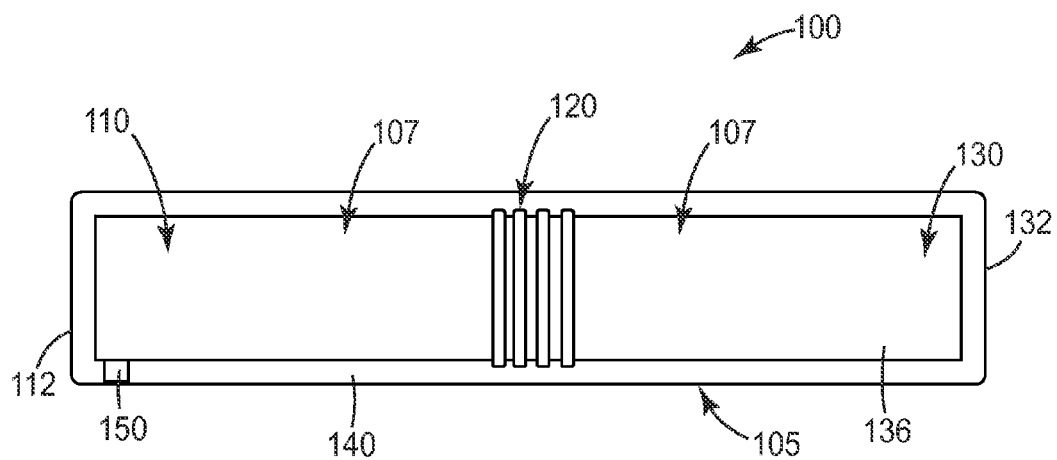
FIG. 1A shows a schematic representation of a heat pipe according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

According to an aspect of the invention a heat pipe includes a body containing a bellows region designed to allow repeated flexing with a reduced level of strain on the body material. The condenser and evaporator sections are located on opposite sides of the bellows region. These sections are relatively thin and wide to maximize the heat transfer area and minimize the volume and hence the weight of the overall heat pipe device. To assure the free flow of vapor across the bellows region, the bellows region may include support structures integrated into the generally undulating surface. These structures serve to prevent external atmospheric pressure or bending from collapsing the vapor channel when the body wall is thin. The heat pipe body may be made of a single piece or of two pieces including the region having undulations, and the generally flat regions on each side thereof. The heat pipe device will be described in more detail with reference to the Figures.

Figure 1B:
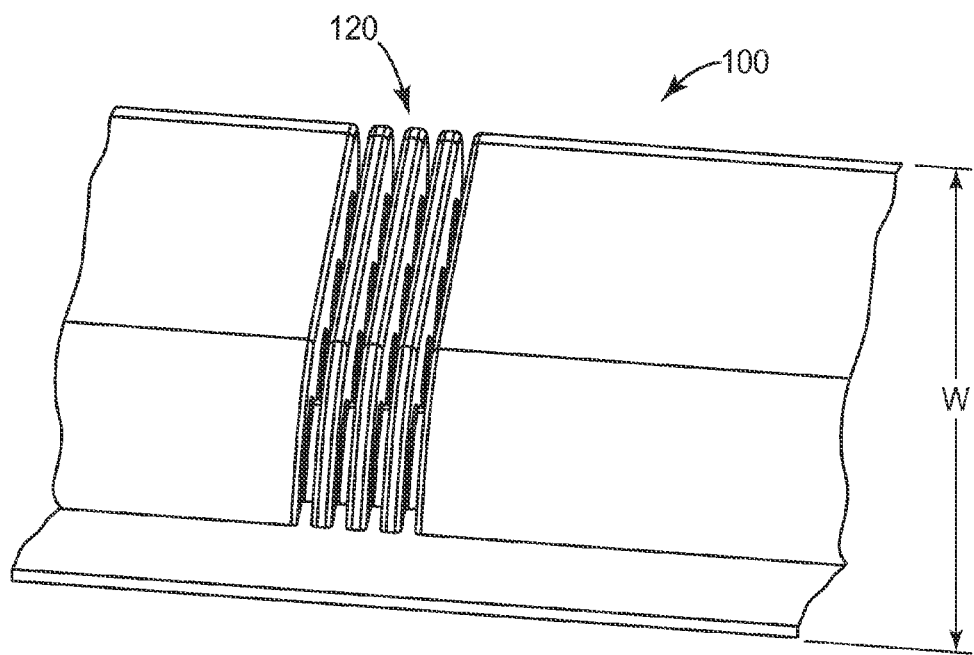
FIG. 1B shows an isometric view of a bellows region of a heat pipe according to an embodiment of the present invention.

FIG. 1A shows an exemplary embodiment of a heat pipe 100. The heat pipe 100 has a sealed flexible body 105 having an evaporator section 130 at a first end 132 of the heat pipe and a condenser section 110 located at the second end 112 of the heat pipe. An adiabatic or transport section 107 connects the evaporator section to the condenser section. A bellows section 120 can be located between the evaporator section and the condenser section in the transport section 107 of the body. The bellows section may be configured to bend around a hinge as shown in FIG. 2B (e.g. 180°). The bellows section may have a bend radius of less than or equal to about one inch without exceeding an elastic limit of the substrate material. If the elastic limit of the material is exceeded, plastic deformation, fatigue or work hardening of the substrate material(s) may cause a shortening of the lifetime or failure of the heat pipe. FIG. 1B shows a close up view of the bellows section 120.

Figure 2A:
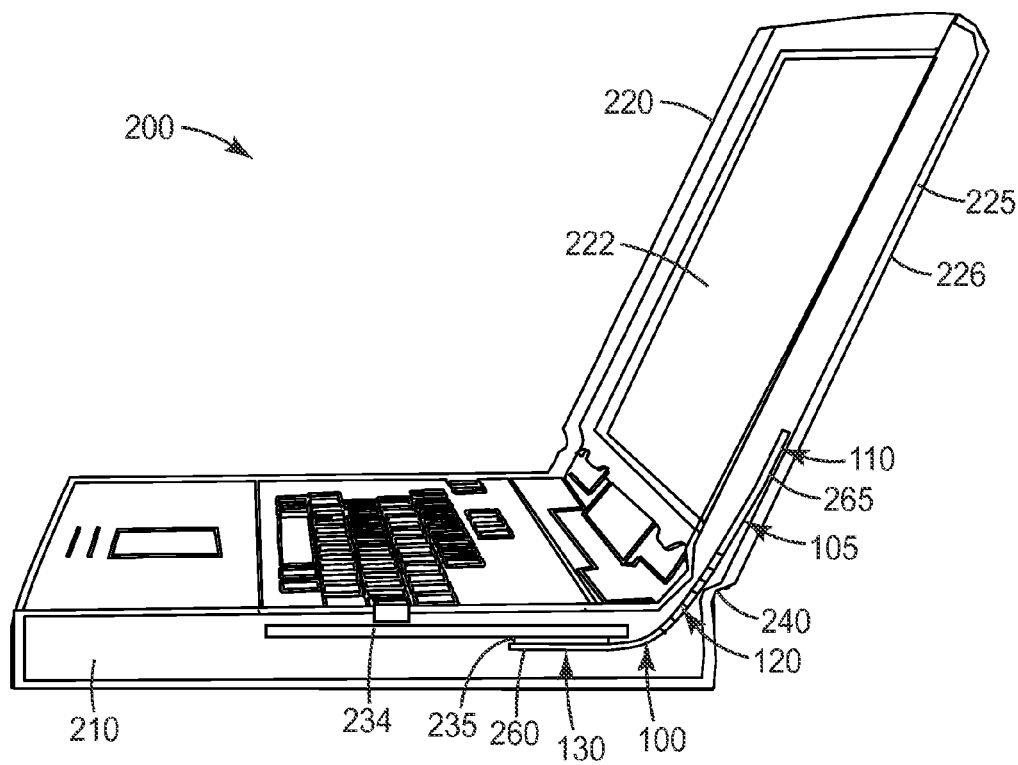
FIG. 2A shows a cut-away schematic representation of a laptop computer including a heat pipe according to an embodiment of the present invention in an open position.
Figure 2B:
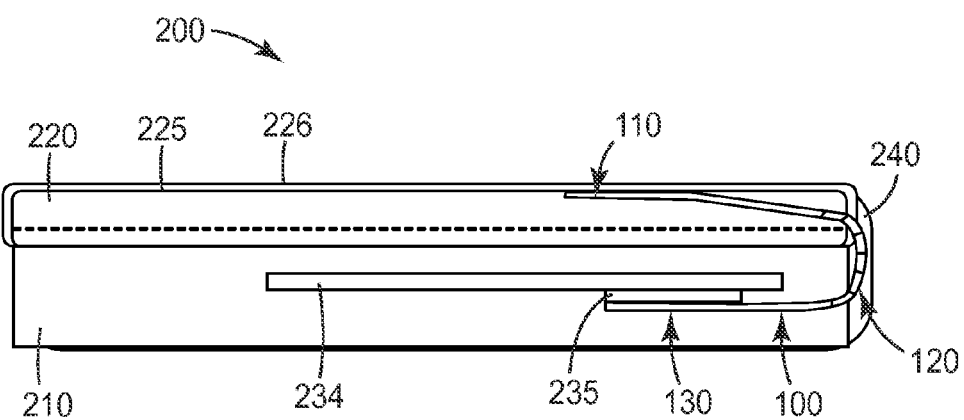
FIG. 2B shows a cut-away schematic representation of a laptop computer including a heat pipe according to an embodiment of the present invention in a closed position.

FIGS. 2A and 2B show a laptop computer 200 including a heat pipe 100 according to an embodiment of the present invention in an open position and a closed position, respectively. Laptop computers typically have a printed circuit board (PCB) 234 including a central processing unit (CPU), memory chips or other heat generating devices 235 located in the base portion 210 of a laptop computer 200. In conventional laptops, the heat generated by the chips is generally dissipated through the base portion of the laptop computer.

In a preferred aspect the heat is dissipated through a backside 226 of the cover 220 of the laptop computer 200 rather than dissipating the heat through the base portion 210 of the computer. As such, the heat pipe passes through the hinge 240 that joins the cover portion 220 to the base portion 210. Also, the heat pipe is sufficiently flexible to allow for repeated opening and closing of the cover. For example, the heat pipe may be bent 180° when the cover is closed and typically between 0° and 90° when the cover is opened. The heat pipe should function when it is at any of these positions.

The body 105 may be made of a single piece of the substrate material. The substrate material may be selected from a metal foil, a polymer film, a metallized polymer film or a combination thereof. When the heat pipe is created from a single piece of substrate, the substrate may be folded in half and bonded around the remaining open edges.

Figure 3:
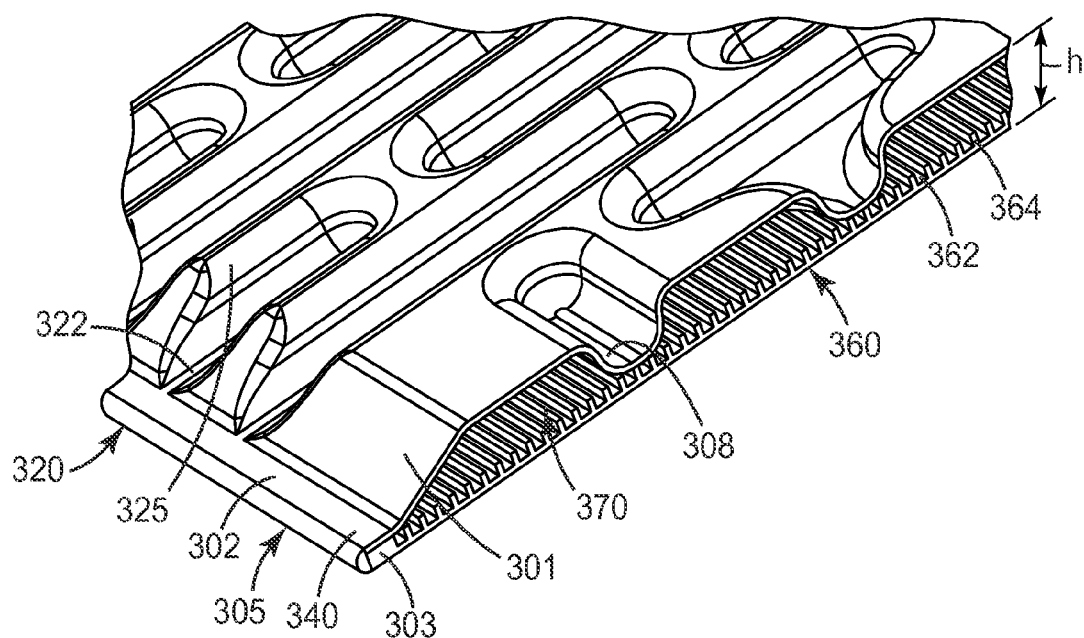
FIG. 3 shows a cut-away isometric view of a heat pipe according to an embodiment of the present invention.

A partial cross section of an exemplary heat pipe is shown in FIG. 3. The figure shows the internal structure of the transport section of exemplary heat pipe adjacent to the bellows section. FIG. 3 shows an exemplary alternative heat pipe body 305 comprising two pieces of substrate material having a top layer 301 and a bottom layer 303. The top and bottom layers may be bonded together around their circumferential edges 302 when the heat pipe is formed. The top layer 301 may be of the same or a different substrate material and may have a similar or different topography as the bottom layer 303. In the exemplary embodiment of FIG. 3, the top layer has a different structure than the bottom layer.

The bottom layer 303 may gave a generally flat exterior surface and a wicking structure 360 integrally formed in its interior surface. In this embodiment, the wicking structure includes as a series of channels 362 that run between adjacent ridges 364 along the longitudinal length of the heat pipe. The wicking structure provides capillary action to move the liquid phase of the working fluid from the condenser section to the evaporator section. Alternatively, the wicking structure may be a metal screen or integrally formed channels, grooves, posts, staggered walls, three dimensional interlace chevrons, three dimensional interlace crosses, and angled walls. In another alternative embodiment, the wicking structure may extend from the condenser section to the evaporator section and include a plurality of zones comprising different relief features. The relief features may include at least one of integrally formed channels, grooves, posts, staggered walls, three dimensional interlace chevrons, three-dimensional interlace crosses, and angled walls. It may be desirable to have post shaped relief features in the evaporator section and channels or staggered wall relief structures in the transport section.

The body of the heat pipe may have a generally planar structure. In one exemplary embodiment, the height (see h, FIG. 3) to width (see w, FIG. 1B) ratio may be 1:4. In another exemplary embodiment, the height to width ratio may be 1:10. In another exemplary embodiment, the height to width ratio may be 1:20. The thickness of the inventive heat pipe is less than about 0.25 inches (6.4 mm).

The body 305 further includes an open chamber or space 370 that extends from the evaporator section to the condenser section. A working fluid (not shown) may be contained inside the chamber 370. The working fluid working fluid may include water, acetone, methanol, ethanol and the like.

The wicking structure 360 may also be disposed in the body 305 to transport the working fluid in a liquid phase from the condenser section to the evaporator section. At least one of the evaporator section, the bellows section or the condenser section may have a wicking structure to facilitate movement of the working fluid from the condenser section to the evaporator section. In one embodiment, the wicking structure runs the entire longitudinal length of the heat pipe.

During operation, heat from a heat source (not shown) is applied to the evaporator section. Working fluid may be vaporized in the evaporator section and is transported to the condenser section through the chamber in the transport region. The working fluid condenses back to its liquid state in the condenser section and is then transported back to the evaporator section by capillary action via the wicking structure.

Referring back to FIG. 1A, the evaporator section 130 has an internal surface and an external surface. A portion of the internal surface of the evaporator section may be flat. Alternatively, the wicking structure may extend through the evaporator section.

As shown in FIGS. 2A and 2B, the evaporator section 130 may contact a heat source (i.e. a processor, a chip set or other heat source) 235 at a first thermal interface 260 on an external surface 136 of the body 105. The external surface may be held in physical contact with the heat source, or a thermal interface material (e.g. a thermal grease, thermal adhesive or thermal interface pad) may be placed between the heat source 235 and the heat pipe 100 to improve heat conduction across the first thermal interface 260.

On the opposite end of the heat pipe, the condenser section 110 will also have an internal surface and an external surface. A portion of the internal surface of the condenser section may be flat. Alternatively, the wicking structure may extend through the condenser section.

The condenser section 110 may contact a heat sink or a heat spreader 225 located in the cover 220 behind the screen 222 at a second thermal interface 265 on an external surface of the body 105. The external surface may be held in physical contact with the heat sink or a thermal interface material (e.g. a thermal grease, thermal adhesive or thermal interface pad) may be placed between the heat sink and the heat pipe to improve heat conduction across the second thermal interface 265. The second thermal interface 265 may be disposed on the same external surface of the body (e.g. the top side) as the first thermal interface 260 or the second thermal interface 265 may be disposed on the opposite external surface of the body from the first thermal interface 260 (i.e. top side/bottom side). Thus, the heat pipe may contact the heat source and heat spreader on the same external surface or different external surfaces of the body. FIG. 2A shows an exemplary embodiment where the heat source 235 and the heat spreader 225 are on opposite sides of the external body of the heat pipe 110.

Referring back to FIG. 3, the body 305 of the heat pipe may be formed by the joining of a top layer 301 and a bottom layer 303 that are joined together along edges 302.

FIGS. 4A-C, 5, 6A-B, and 7A-B show several alternative embodiments of the bellows section (420, 520, 620, 720) of the heat pipe. The bellows section is an articulated joint disposed in the transport region (407, 507, 607, 707) of the heat pipe that interconnects the condenser section with the evaporator section. The bellows section includes internal supports to keep the chamber open during bending of the heat pipe at the bellows section, thus reducing the likelihood that bending of the heat pipe will lead to a constriction or pinching of the vapor channel. Additionally, the support structures (422, 522, 622, 722) can create a tortuous flow path (499, 599, 699, 799), such as shown in FIGS. 4C, 5, 6B and 7B, respectively, through the bellows section. The tortuous flow path may be an undulating vapor flow path across the bellows section. Alternatively, the flow path can comprise a series of staggered spaced apart wall sections (422, 522) running generally perpendicular to the longitudinal length of the body or a plurality of spaced apart post support structures (622, 722) arranged along the width and length of the bellows section. The posts may be aligned in rows and columns or may be disposed in a staggered conformation.

The use of staggered walls or posts can minimize tensile stresses along the heat pipe when the heat pipe is bent. Controlling the tensile stresses on the substrate material allows the heat pipe to be bent without exceeding the elastic limit of the material. If the elastic limit of the material is exceeded, plastic deformation, fatigue or work hardening of the substrate material(s) may cause a shortening of the lifetime or failure of the heat pipe. In a preferred aspect, the bellows section is designed such that the substrate material does not exceed 85% of the material's elastic limit. In a more preferred embodiment, the bellows section is designed such that the substrate material does not exceed 90% of the material's elastic limit.

Figure 4A:
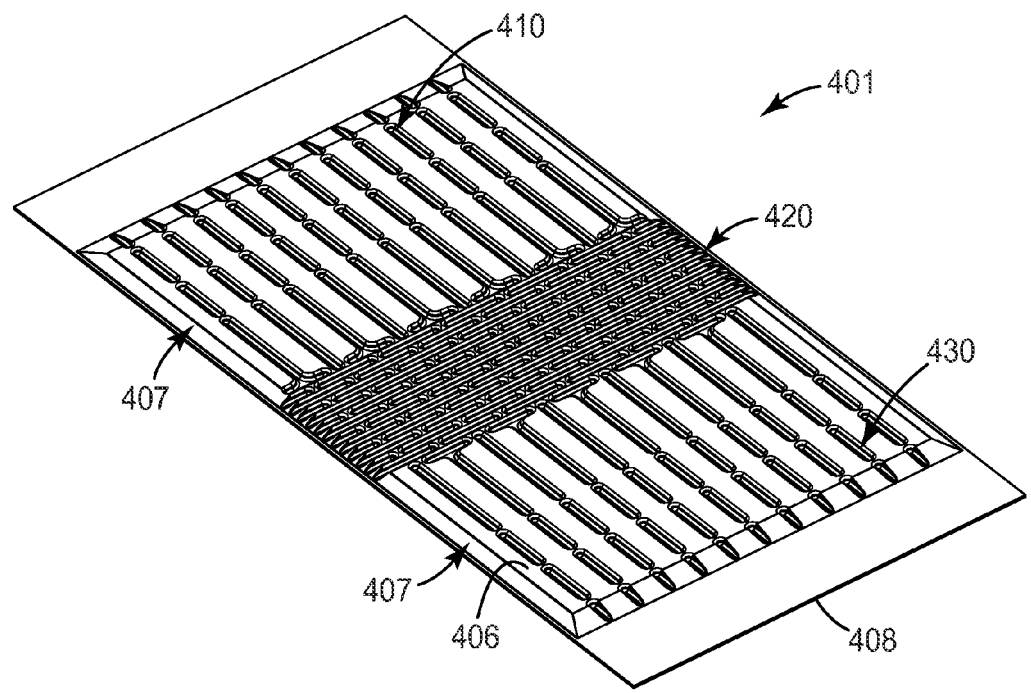
FIG. 4A shows an isometric view of an exemplary layer of a heat pipe according to an embodiment of the present invention.
Figure 4B:
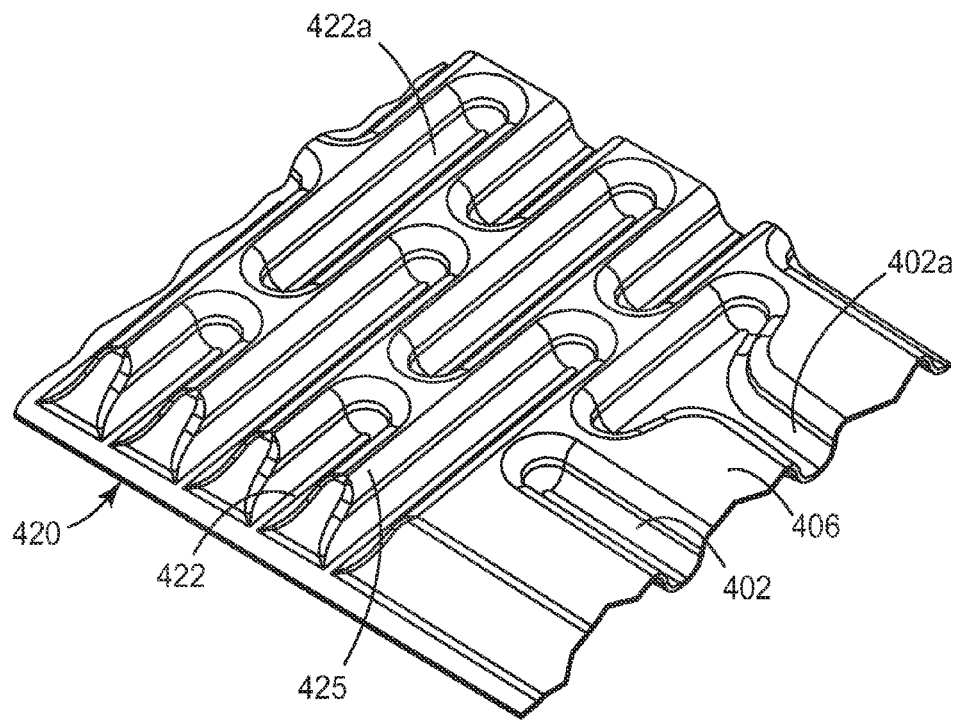
FIG. 4B shows an isometric view of a portion of an external surface of the bellows region of the heat pipe layer of FIG. 4A.
Figure 4C:
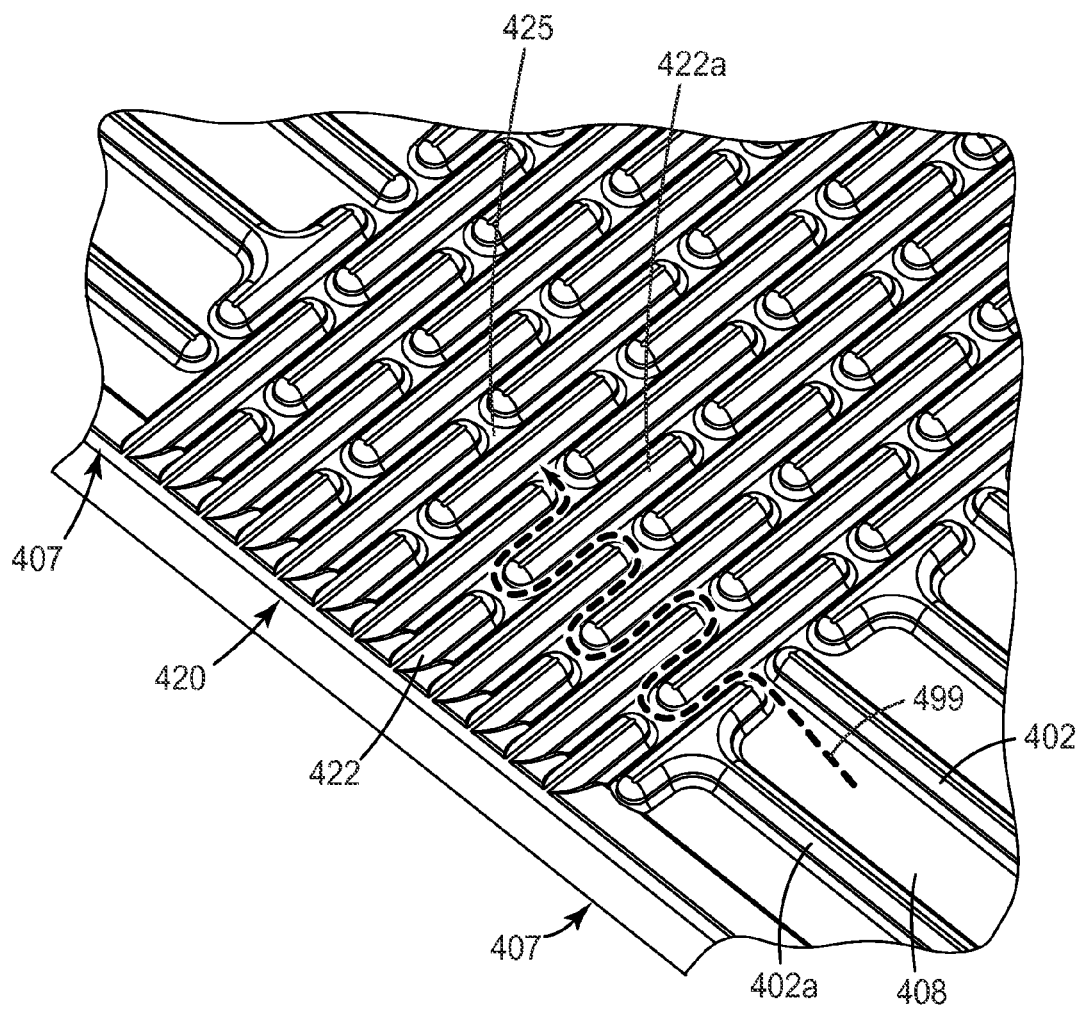
FIG. 4C shows an isometric view of a portion of an internal surface of the bellows region of the heat pipe layer of FIG. 4A.

Specifically, FIGS. 4A-C show an exemplary embodiment of a top layer 401 of the heat pipe. FIG. 4A shows the entire top layer having a condenser section 410, a transport section 407 including a bellows section 420, and an evaporator section 430. FIG. 4B shows an external surface 406 of the top layer 401 and FIG. 4C shows an internal surface 408 of the top layer 401. The bellows section includes internal support structures 422 in the form of staggered wall sections 422, 422a shown as indentions in FIG. 4B and as projections in FIG. 4C. The staggered wall sections help to keep the chamber 525 (shown as raised features in FIG. 4B and as depressions in FIG. 4C) open when the heat pipe is bent. The tops of wall sections press against the bottom layer of the body (not shown) to maintain the vapor flow path around and between the wall sections 422, 422a. The chamber through the bellows section of this embodiment results in a tortuous vapor flow path 499 in this section.

Additionally, the transport section may also include reinforcing structures 402, 402a to further maintain the vapor flow path during repeated bending and prevent the top layer from collapsing in the transport section.

Figure 5:
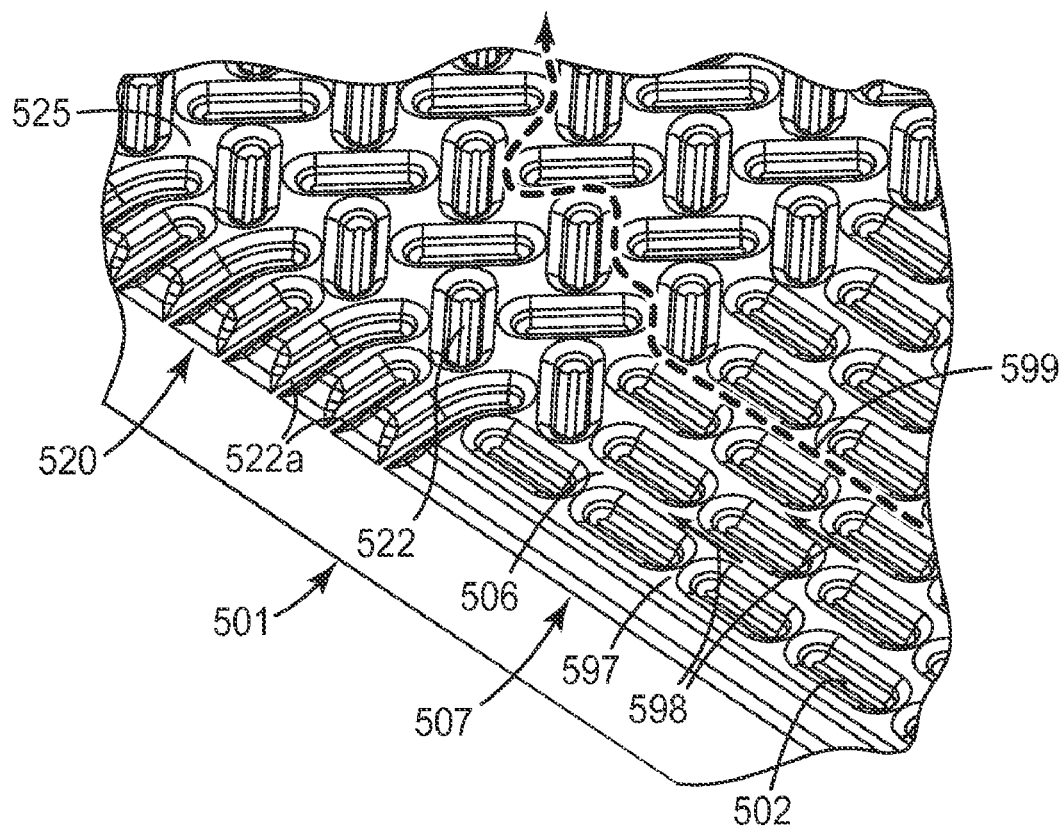
FIG. 5 shows an isometric view of a portion of an external surface of a bellows region of another exemplary embodiment of the present invention.

In another aspect, specifically, FIG. 5 shows an alternative top layer 501 of the heat pipe. External surface 506 of the top layer 501 extends into the bellows section 520. The bellows section includes internal support structures 522 in the form of interlaced wall sections 522, 522a shown as indentions. The wall sections 522 help to keep the chamber 525 (shown as raised features) open when the heat pipe is bent. The tops of wall sections press against the bottom layer (not shown) to maintain the vapor flow path around and between the wall sections 522, 522a. Tortuous vapor flow path 599 provides an example vapor flow path through the heat pipe.

Additionally, the transport section 507 may also include reinforcing structures 502 shown as short staggered walls, to maintain the vapor flow path and prevent the top layer from collapsing in the transport section during repeated bending. Having several openings 597 disposed between flow channels in the transport section can be advantageous—should one flow channel 598 get blocked, the vapor can find alternate flow patterns. This exemplary structure allows the heat pipe to continue operating without a significant decrease in its performance even with one or more of the flow channels being blocked.

Figure 6A:
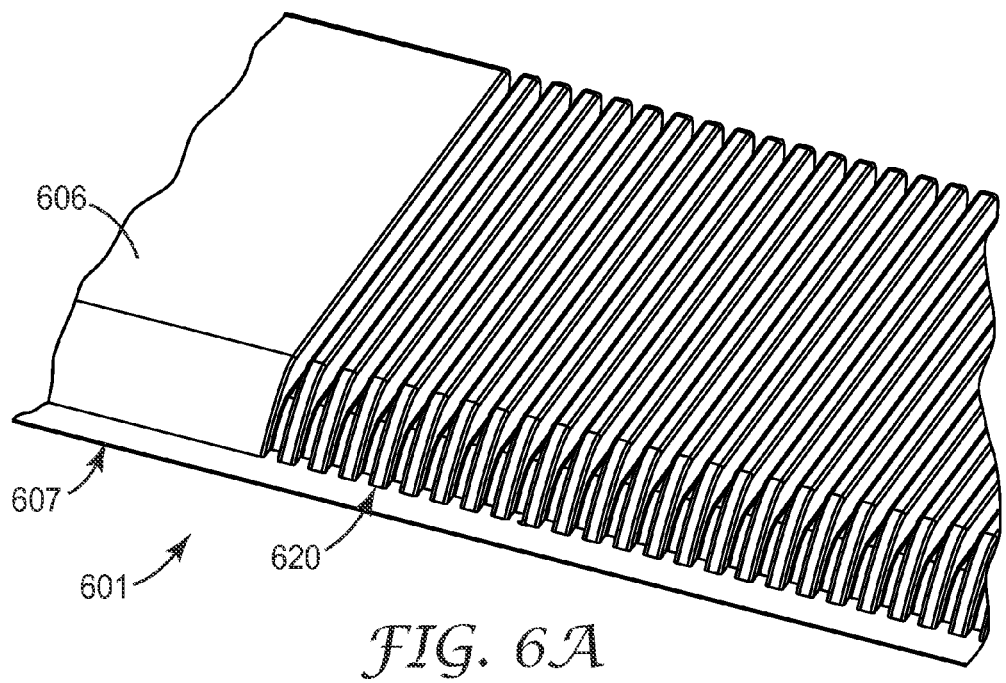
FIG. 6A shows an isometric view of a portion of an external surface of the bellows region of another exemplary embodiment of the present invention.
Figure 6B:
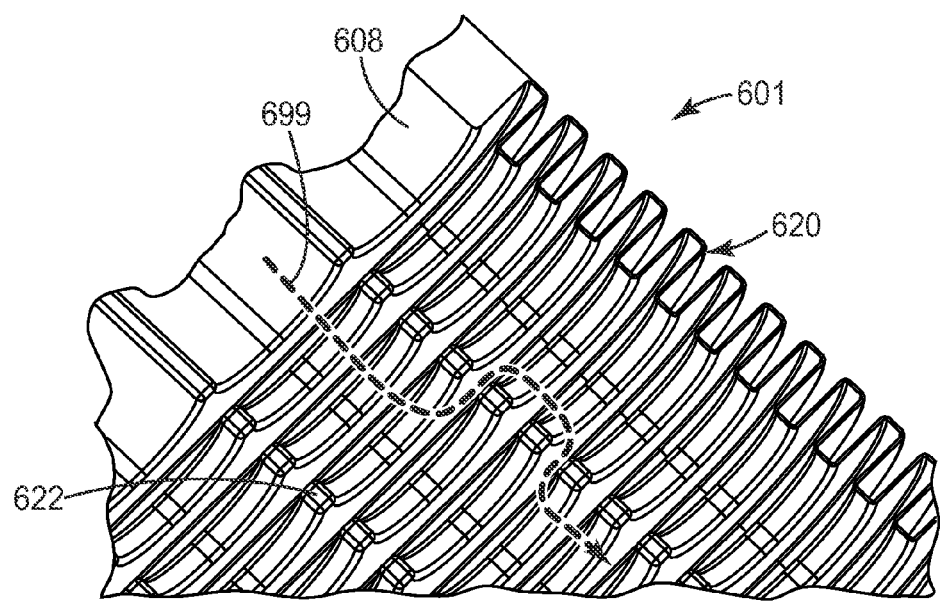
FIG. 6B shows an isometric view of a portion of an internal surface of the bellows region of the embodiment of FIG. 6A.

Another exemplary embodiment of a top layer 601 of the heat pipe is shown in FIGS. 6A and 6B. FIG. 6A shows an external surface 606 of the top layer 601 and FIG. 6B shows an internal surface 608 of the top layer 601. FIG. 6A shows a bellows section having an articulated structure to facilitate bending. The bellows section also includes internal support structures 622 in the form of posts shown in FIG. 6B. The posts can keep the chamber open when the heat pipe is bent. The tops of the posts press against the bottom layer (not shown) to maintain the vapor flow path around and between the posts 622. The working fluid vapor phase may take many alternative paths through the bellows section (e.g. tortuous vapor flow path 699). The alternative paths may be especially useful when one of the longitudinal paths is blocked.

Figure 7A:
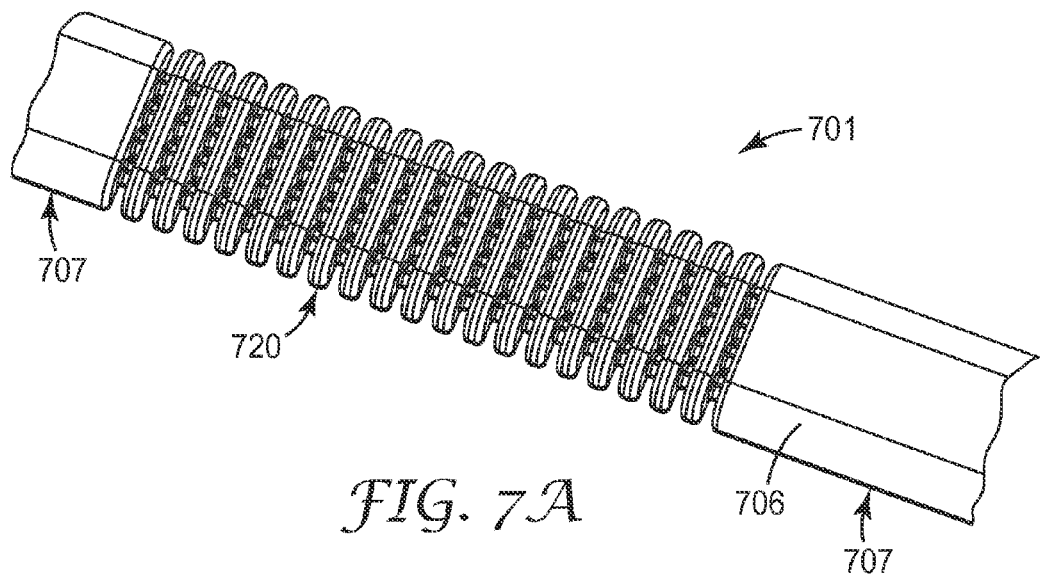
FIG. 7A shows an isometric view of a portion of an external surface of the bellows region of another exemplary embodiment of the present invention.
Figure 7B:
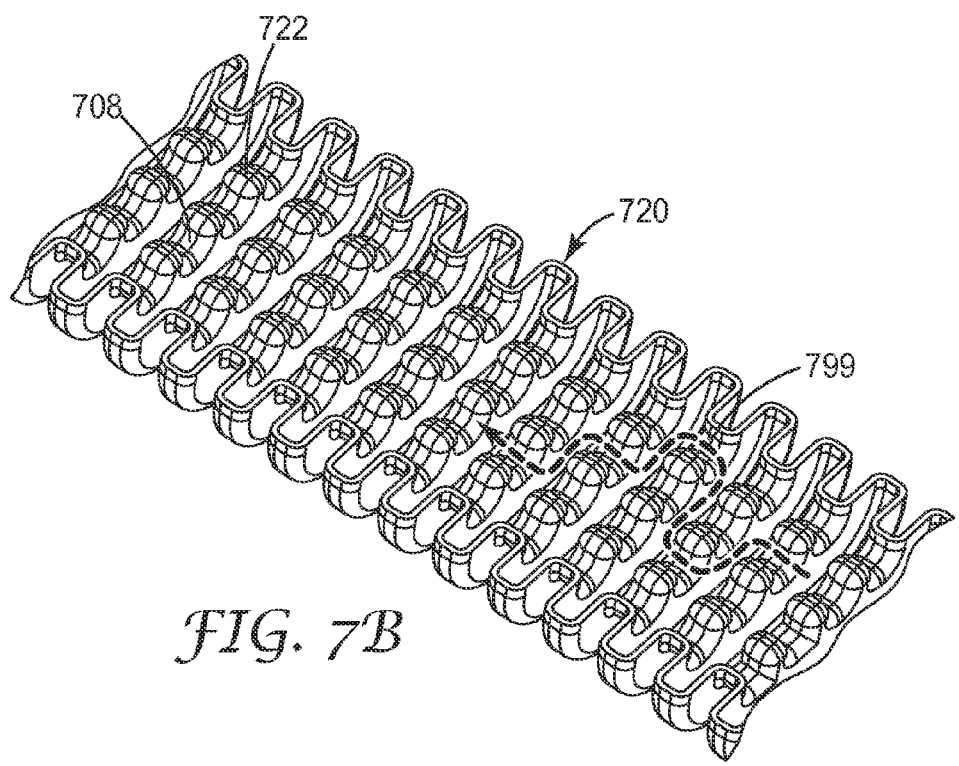
FIG. 7B shows an isometric view of a portion of an internal surface of the bellows region of the embodiment of FIG. 7A.

FIGS. 7A and 7B show yet another exemplary embodiment of a top layer 701 of the heat pipe of the bellows section 720. FIG. 7A shows an external surface 706 of the top layer 701 and FIG. 7B shows an internal surface 708 of the top layer 701. FIG. 7A shows a bellows section 720 having an articulated structure to facilitate bending within the transport section 707. The bellows section also includes internal support structures 722 in the form of posts shown in FIG. 7B. The posts can keep the chamber open when the heat pipe is bent. The tops of the posts press against the bottom layer (not shown) to maintain the vapor flow path around and between the posts 722. The working fluid vapor phase may take many alternative paths through the bellows section (e.g. tortuous vapor flow path 799). The alternative paths may be especially useful when one of the longitudinal paths is blocked.

The internal support structures described above may be formed mechanically by standard molding, stamping or coining features into the surface of a metal foil, a metallized polymer film or polymer film. Alternatively, the structures may be formed additively by plating metallic features on the surface of a metal foil, metallized polymer film or a seeded polymer film. Another alternative approach to form the support structures is through a subtractive chemical or dry etch process to remove material between features on the surface of a metal foil, metallized polymer film or polymer film. The wicking structure (e.g. integral channels) may also be formed on the interior surface(s) of the body by similar processes as described above. Alternatively, a separate wicking layer (e.g. a screen or non-woven mesh) may be used.

The body of the heat pipe may be formed using two patterned copper foils prepared by one of the methods above. The top and bottom layers may be aligned and joined together around the perimeter of the body. Joining methods such as soldering, welding and brazing may be used. A small opening is left to serve as the filling port to add the working fluid to the heat pipe. Alternatively, the edges may be completely sealed if one of the layers has an opening to add the working fluid.

The working fluid (e.g. deionized, deaerated water) may be added to completely fill the heat pipe. The excess water may be boiled off until an operational volume of water remains. The process generates steam which pushes any residual air out of the body of the heat pipe. The opening may now be sealed. This process results in the internal pressure of less than one atmosphere in the heat pipe at room temperature.

In an alternative method, a known volume of working fluid can be added to the heat pipe and any remaining air can be evacuated. In this process, the heat pipe may be attached to a vacuum system through the filling port. A vacuum may be drawn on the heat pipe to remove any air in the body of the heat pipe. A known volume of working fluid is added to the body of the heat pipe through the filling port. The system can be evacuated a second time and the filling port can sealed while the heat pipe is under vacuum.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

We claim:

1. A heat pipe for cooling a heat-generating component, comprising
    a generally planar, sealed flexible body having an evaporator section, a condenser section, and a flexible bellows section located between the evaporator section and the condenser section along a longitudinal length of the body;
    a chamber extending from the evaporator section to the condenser section inside the body;
    a working fluid contained inside the chamber,
    a wicking structure disposed in at least the condenser section and the bellows section, wherein the wicking structure is formed integrally on an inner surface of the body; and
    wherein the bellows section includes internal supports to keep the chamber open during repeated bending of the heat pipe at the bellows section.

2. The heat pipe of claim 1 wherein the body comprises of a single piece of a substrate material.

3. The heat pipe of claim 2 wherein the substrate material comprises at least one of a metal foil, a polymer film, and a metallized polymer films.

4. The heat pipe of claim 2 wherein the bellows region has a bend radius of less than or equal to about one inch without exceeding an elastic limit of the substrate material.

5. The heat pipe of claim 1 wherein the body includes a top layer and a bottom layer.

6. The heat pipe of claim 1 wherein the bellows section is formed integrally with at least one of the evaporator section and the condenser section.

7. The heat pipe of claim 1 wherein the wicking structure includes channels integrally formed on an interior surface of the body that extend from the condenser section to the evaporator section and provides capillary action to move working fluid from the condenser section to the evaporator section.

8. The heat pipe of claim 1 wherein the wicking structure extends from the condenser section to the evaporator section and includes a plurality of zones comprising different relief features wherein the relief features include at least one of integrally formed channels, grooves, posts, staggered walls, three dimensional interlace chevrons, three dimensional interlace crosses, and angled walls.

9. The heat pipe of claim 1 wherein the internal supports create a tortuous flow path through the bellows section.

10. The heat pipe of claim 9 wherein the tortuous flow path comprises an undulating channel across the bellows section.

11. The heat pipe of claim 9 wherein the tortuous flow path comprises a series of staggered spaced apart wall sections running generally perpendicular to the longitudinal length of the body.

12. The heat pipe of claim 1 wherein the evaporator section includes a flat internal surface.

13. The heat pipe of claim 1 wherein the bellows section has a thickness of less than or equal to about 0.25 inches.

14. The heat pipe of claim 1 wherein the heat pipe includes an adhesive strip attached to an outer surface of the flexible body disposed opposite the evaporator section to secure the heat pipe to the heat-generating component.

15. The heat pipe of claim 1 wherein the heat pipe has an adhesive strip attached to an outer surface of the flexible body disposed opposite the condenser section to secure the heat pipe to a heat sink.

16. The heat pipe of claim 1 wherein in the width of bellows section is greater than four times its thickness.

17. A heat pipe for cooling a heat-generating component, comprising
- a generally planar, sealed flexible body having an evaporator section, a condenser section, and a flexible bellows section located between the evaporator section and the condenser section along a longitudinal length inside the body;
- a chamber extending from the evaporator section to the condenser section inside the body;
- a working fluid contained inside the chamber,
- a wicking structure disposed along the length of the body, wherein the wicking structure comprises a series of parallel grooves integrally formed on an inside surface of the body; and
- wherein the bellows section includes internal supports spaced across the width of the heat pipe to keep the chamber open during bending of the heat pipe at the bellows section.

18. An electronic device comprising:
- a base;
- a cover;
- a hinge to pivotably attach the base to the cover;
- a heat generating component located in one of the base or the cover and a heat sink located in the other of the cover or the base; and
- a flexible heat pipe providing a heat conduction path between the heat generating device and the heat sink, wherein the heat pipe is formed of a substrate material having an elastic limit and wherein the heat pipe comprises substantially flat, sealed flexible body having an evaporator section in thermal contact with the heat generating device, a condenser section in thermal contact with the heat sink, and a flexible bellows section located between the evaporator section and the condenser section inside the body to enable the heat pipe to bend without exceeding the elastic limit of the substrate material wherein the bellows section is disposed in the hinge of the electronic device, wherein the flexible heatpipe includes a wicking structure disposed in at least the condenser section and the bellows section, wherein the wicking structure is formed integrally on an inner surface of the body.

19. The electronic device of claim 18 wherein electronic device is a laptop computer.

* * * * *